United States Patent
Hennes et al.

(10) Patent No.: US 10,124,762 B2
(45) Date of Patent: Nov. 13, 2018

(54) APPARATUS AND METHOD FOR IMPROVING WEAR-COMFORT OF A SEATBELT

(71) Applicant: FORD GLOBAL TECHNOLOGIES, LLC, Dearborn, MI (US)

(72) Inventors: Nikica Hennes, Aachen (DE); Jeroen Lem, Maastricht (NL); Jessica Rebecca Rausch, Moenchengladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/218,359

(22) Filed: Jul. 25, 2016

(65) Prior Publication Data
US 2017/0021799 A1    Jan. 26, 2017

(30) Foreign Application Priority Data
Jul. 24, 2015    (DE) .................. 10 2015 214 004

(51) Int. Cl.
*B60R 22/48* (2006.01)
*B60R 22/44* (2006.01)

(52) U.S. Cl.
CPC .............. *B60R 22/48* (2013.01); *B60R 22/44* (2013.01); *B60R 2022/485* (2013.01); *B60R 2022/4841* (2013.01); *B60R 2022/4866* (2013.01)

(58) Field of Classification Search
CPC ......... B60R 22/18; B60R 22/26; B60R 22/48; B60R 22/44; B60R 2022/485; B60R 2022/4866; B60N 2/002; B60N 2/0276; B60N 2002/981
See application file for complete search history.

(56) References Cited

U.S. PATENT DOCUMENTS

| | | |
|---|---|---|
| 6,203,059 B1 | 3/2001 | Mazur et al. |
| 6,952,974 B2 | 10/2005 | Lin |
| 7,100,980 B2 | 9/2006 | Young et al. |
| 7,519,461 B2 | 4/2009 | Kennedy et al. |
| 7,708,341 B2 | 5/2010 | Takai et al. |
| 7,772,541 B2 | 8/2010 | Froggatt et al. |

(Continued)

FOREIGN PATENT DOCUMENTS

| | | |
|---|---|---|
| DE | 202004001895 U1 | 6/2005 |
| DE | 69924759 T2 | 3/2006 |

(Continued)

OTHER PUBLICATIONS

Search Report, German App. No. 10 2015 214 004.0, dated Aug. 12, 2015.

*Primary Examiner* — Adam D Tissot
*Assistant Examiner* — Aaron C Smith
(74) *Attorney, Agent, or Firm* — Brooks Kushman P.C.

(57) ABSTRACT

An apparatus and method for improving the safety-relevant wear-comfort of a seatbelt worn by an occupant of a vehicle seat uses at least one sensor to detect the contour and/or position of the seatbelt, at least one actuator system for moving the seatbelt in order to change the contour and/or position, and at least one control module for controlling the actuator system. The control module is operative to control the actuator system automatically as a function of a deviation of the seatbelt contour/position, as detected by the sensor, from a predefined contour/position which reflects correct wear of the seatbelt.

9 Claims, 3 Drawing Sheets

(56) References Cited

U.S. PATENT DOCUMENTS

| | | | | |
|---|---|---|---|---|
| 2004/0040393 | A1* | 3/2004 | Specht | G01L 5/105 73/862.391 |
| 2006/0217864 | A1* | 9/2006 | Johnson | B60N 2/002 701/45 |
| 2007/0135982 | A1* | 6/2007 | Breed | B60J 10/00 701/36 |
| 2007/0246927 | A1* | 10/2007 | Okada | B60R 22/00 280/804 |
| 2015/0127224 | A1* | 5/2015 | Tabe | B60R 22/48 701/45 |
| 2015/0217720 | A1* | 8/2015 | Palaniappan | B60R 22/18 280/804 |

FOREIGN PATENT DOCUMENTS

| | | | | |
|---|---|---|---|---|
| DE | 602004000654 T2 | 4/2007 | | |
| DE | 102006040244 B3 | 8/2007 | | |
| DE | 102006027414 A1 | 12/2007 | | |
| DE | 102013018742 A1 | 5/2015 | | |
| JP | 2004351997 A | * | 12/2004 | B60Q 3/242 |
| JP | 2017019342 A | * | 1/2017 | |

\* cited by examiner

APPARATUS AND METHOD FOR IMPROVING WEAR-COMFORT OF A SEATBELT

CROSS-REFERENCE TO RELATED APPLICATIONS

This application claims foreign priority benefits under 35 U.S.C. § 119(a)-(d) to DE 10 2015 214 004.0 filed Jul. 24, 2015, which is hereby incorporated by reference in its entirety.

TECHNICAL FIELD

The present invention relates to method and apparatus for improving the effectiveness and/or wear-comfort of a seatbelt worn by a seat occupant.

BACKGROUND

The willingness of a seat occupant to put on a seatbelt may depend on the wear comfort of the seatbelt. It is therefore possible, for example, for a seatbelt which is incorrectly set in terms of height to run along the neck of the seat occupant instead of over their shoulder. On the one hand, a seatbelt which has been put on in such a way can represent, in the case of an accident, a safety risk for the occupant, since injuries to the neck caused by the seatbelt may result, and on the other hand the seatbelt running along the neck can also cause skin irritation on the neck and therefore result in poor wear comfort. For example it is frequently found in the case of children that they wear the seatbelt under their arm instead of over their shoulder, which constitutes an even greater safety risk in the case of an accident, since the safety belt then has a significantly restricted restraining capacity. A seatbelt which runs along the neck or a seatbelt which is being worn under an arm, in other words a seatbelt which has not been put on according to regulations, constitutes here an accident-related safety-relevant wear-comfort property of the seatbelt.

U.S. Pat. No. 6,952,974 B2 discloses, for example, the use of a seatbelt tension sensor for a seatbelt of a seat occupant, in order to be able to control an ignition property of an airbag as a function thereof, by automatically detecting whether a child's seat has been positioned on the vehicle seat (relatively high seatbelt tension) or an occupant is sitting on it (relatively low seatbelt tension).

Furthermore U.S. Pat. No. 7,519,461 B2 discloses a system for classifying seat occupant by using a plurality of sensors arranged under a seat cushion of the vehicle seat, and a seatbelt tension sensor.

A detection system, equipped with a plurality of sensors, for a seat occupant is also known from U.S. Pat. No. 7,100,980 B2. The sensors are arranged in a seat cushion of the vehicle seat.

A further device for detecting an occupied state of a seat is described in DE 20 2004 001 895 U1.

U.S. Pat. No. 7,708,341 B2 discloses a vehicle seat for determining a sitting position of an occupant sitting therein.

Generally, seatbelt systems which output an optical and/or acoustic warning signal when a seatbelt has not been put on during a journey are also known from the prior art.

SUMMARY

Embodiments of the invention disclosed herein provide apparatus and a method for improving the safety-relevant wear-comfort of a seatbelt being worn by a seat occupant, with which apparatus and method the safety function of the seatbelt can be enhanced. Furthermore, the acceptance of a seat occupant with respect to the putting on of the seatbelt is to be increased.

It is to be noted that the features specified individually in the claims can be combined with one another in any technically appropriate fashion and disclose further refinements of the invention. The description characterizes and specifies the invention, in particular additionally with respect to the figures.

According to the present disclosure, apparatus for improving the safety-relevant wear-comfort of a seatbelt worn by a seat occupant comprises at least one sensor for sensing at least one of a contour, a positioning, and a tension of the seatbelt, at least one actuator system for moving or repositioning the seatbelt in a manner to change the contour and/or position so as to improve the safety-relevant wear-comfort, and at least one electronic control module (ECM) for controlling the actuator system. The ECM is operative to control the actuator system automatically as a function of a deviation of the contour and/or position, detected by the sensor, from a predefined contour/position which corresponds to a preferred or correct seatbelt wear-comfort. The safety-relevant wear-comfort property comprises at least one seatbelt contour detected by the sensor. In other words, the at least one sensor is able to detect the position, the contour and therefore the instantaneous profile or shape of the seatbelt, as a result of which a wear-comfort property of the seatbelt, which is relevant for safety with respect to a possible accident, such as, for example, a seatbelt height, looseness of the seatbelt, twisting of the seatbelt and/or seatbelt positioning, which is unfavorable with respect to safety, of the occupant sitting in the vehicle seat can be detected, for example if the seatbelt runs along the occupant's neck or under their arm or behind the vehicle seat, or the occupant is sitting on the seatbelt. By sensing the seatbelt contour, position, and/or tension, it is possible to sense a multiplicity of safety-critical wear-comfort properties of the seatbelt and correspondingly improve/correct them. Inter alia, it is also possible to estimate the body weight and the body size, with the result that safety systems of the vehicle can be optimized further in the case of an accident.

For example, in the case of twisting of the seatbelt detected by sensing the seatbelt contour, the seatbelt can be pulled on with a predetermined pulling force by means of a seatbelt pre-tensioner, in order to remove the twisting of the seatbelt. The invention therefore makes it possible to enhance simultaneously the safety function of the seatbelt and the acceptance with respect to the putting of the seatbelt owing to an optimized wear-comfort property.

An actuator system within the meaning of the present invention comprises, in particular mechanical, electrical, electromechanical and optical and/or acoustic actuators such as, for example, optical and/or acoustic warning/notification devices.

According to one advantageous refinement of the invention, the safety-relevant wear-comfort property also comprises a seatbelt tension detected by the sensor. In this way, for example looseness of the seatbelt (excessively low seatbelt tension) or guidance of the seatbelt which is too taut for pleasant wear comfort can be detected and corrected.

A further advantageous refinement of the invention provides that the sensor is at least one fiber-optic sensor arranged in the seatbelt. In this context, the fiber-optic sensor can be arranged in the seatbelt, in the longitudinal direction and/or transverse direction thereof. In the case of fiber-optic sensors, the measurement variable is not represented or transmitted by means of an electrical variable but rather by means of an optical one. The fiber-optic sensor can advantageously be used to determine simultaneously both the seatbelt contour and the seatbelt tension. In order to determine such properties it is possible, for example, to use an arrangement described in U.S. Pat. No. 7,772,541 B2, the disclosure of which is incorporated herein in its entirety.

The fiber-optic sensor preferably has a plurality of measurement points along its longitudinal extent, with the result that the profile or the contour of the seatbelt can be sensed precisely. Furthermore, a plurality of fiber-optic sensors are preferably arranged in a matrix-like fashion in the seatbelt.

According to one advantageous refinement of the invention, the actuator system comprises a vertical adjustment device of the seatbelt. The ECM can therefore automatically actuate the vertical adjustment device to adapt the height of the seatbelt as soon as it is detected by means of the sensor that the seatbelt is, for example, running along the neck of the occupant sitting in the vehicle seat, which can be sensed by means of the particular seatbelt contour caused by the neck.

According to yet another advantageous refinement of the invention, the actuator system comprises a seatbelt pretensioner. With the latter it is possible, for example, to adapt the seatbelt tension automatically by means of the ECM if it is detected by the sensor that the instantaneous seatbelt tension is too low (looseness of the seatbelt) or too high.

Yet another advantageous refinement of the invention provides that the actuator system comprises a seatbelt force limiter. Seatbelt force limiters prevent the occupant held by the seatbelt from being pulled back into the vehicle seat too hard in the event of an accident, thereby avoiding injuries. By sensing the seatbelt contour it is possible to estimate an approximate build of the occupant sitting in the vehicle seat and calculate on the basis thereof an optimum pulling force for the seatbelt force limiter by means of the ECM. Accordingly, in the case of an accident the method of action of the seatbelt force limiter can be improved.

According to yet another advantageous refinement of the invention, the actuator system comprises an optical and/or acoustic notification device. By means of the latter it is possible for the occupant sitting in the vehicle seat always to be provided with a warning message as soon as a safety-relevant wear-comfort property of the seatbelt which is insufficient with respect to an accident is detected. For example, in the case of seatbelt positioning which is not according to regulations, for example when the seatbelt is being worn under the arm or the occupant is sitting on the seatbelt or the seatbelt is being guided under the vehicle seat, an optical and/or acoustic notification can be output and the occupant can therefore be made to change the detected, safety-critical wear-comfort property accordingly. Likewise, the notification can also be output, for example, when twisting of the seatbelt is detected.

A further advantageous refinement of the invention provides that the apparatus also comprises an airbag restraining system for the occupant sitting in the vehicle seat, the actuator system comprising a triggering device of the airbag restraining system, with which triggering device at least an airbag triggering time and/or an airbag inflation speed can be influenced. In this way, the airbag triggering time and/or the airbag inflation speed can be optimized in accordance with the sensed seatbelt contour. Furthermore, the approximate distance between the steering wheel and the vehicle seat is preferably predefined or estimated and can then be included, for further optimization, in the definition of the airbag triggering time and/or the airbag inflation speed by means of the ECM.

A further advantageous refinement of the invention provides that the apparatus also contains a controller of a headrest which can be positioned automatically. The body size and body weight can be estimated by means of the seatbelt profile, as a result of which an optimum headrest position can be set in the event of an accident.

According to a further aspect of the invention, a method for improving at least one accident-related, safety-relevant wear-comfort property of a seatbelt which has been put on by a seat occupant is provided, which method comprises at least the following steps:

detecting an instantaneous safety-relevant actual wear-comfort property by means of at least one sensor, wherein the safety-relevant wear-comfort property comprises a seatbelt contour detected by the sensor element, and automatically controlling an actuator system for influencing the contour of the seatbelt by means of a ECM as a function of a deviation of the contour, as detected by the sensor element, from a predetermined safety-relevant setpoint contour.

With respect to the definitions, properties and advantages of such a method, reference is made to the preceding description of the apparatus according to the invention for improving at least one accident-related, safety-relevant wear-comfort property of a seatbelt which has been put on by a seat occupant, which definitions, properties and advantages are intended also to apply to the method according to the invention.

Further features and advantages of the invention can be found in the following description of an exemplary embodiment of the invention, which is not to be understood in a restricted fashion and which is explained in more detail below with reference to the drawing, in which, in each case schematically:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, parts which are equivalent in respect of their function are always provided with the same reference symbols, and they are therefore generally also described only once.

Figure 1:
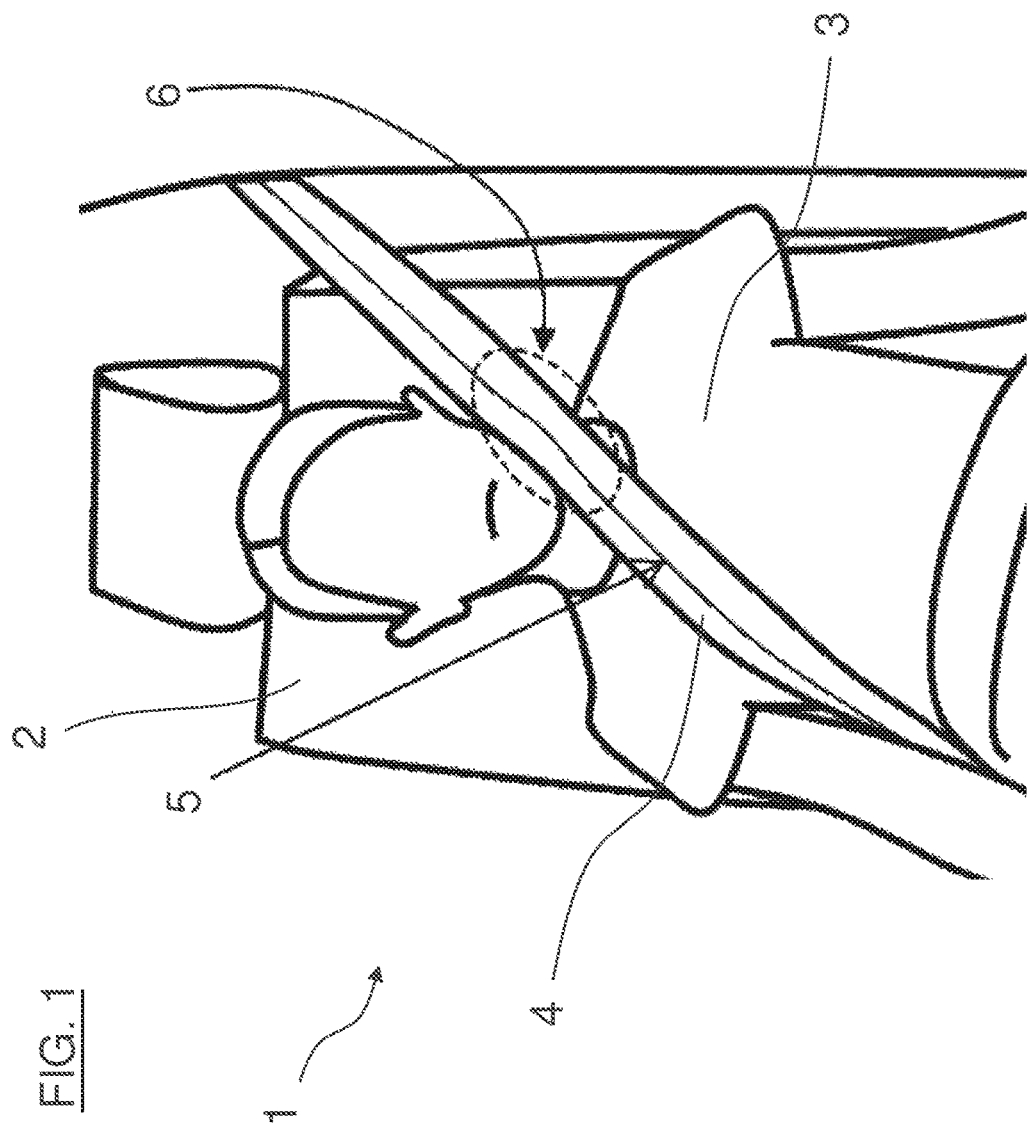
FIG. 1 shows an exemplary embodiment of apparatus according to the invention in association with a seatbelt having a first contour before adjustment by the apparatus.

FIG. 1 illustrates an exemplary embodiment of apparatus 1 for improving the safety-relevant wear-comfort of a seatbelt 4 which is worn by an occupant 3 sitting in a vehicle seat 2 of a motor vehicle (not illustrated further). The apparatus 1 comprises at least one sensor 5 (illustrated by way of example in FIG. 1) which is, in the exemplary embodiment shown, a fiber-optic sensor element 5 which is arranged in the seatbelt 4 and extends in the longitudinal direction of the seatbelt 4. The sensor 5 serves to sense an instantaneous, safety-relevant actual wear-comfort property of the seatbelt. In particular, a seatbelt contour and a seatbelt tension of the seatbelt 4 can be sensed by the fiber-optic sensor 5.

Figure 3:
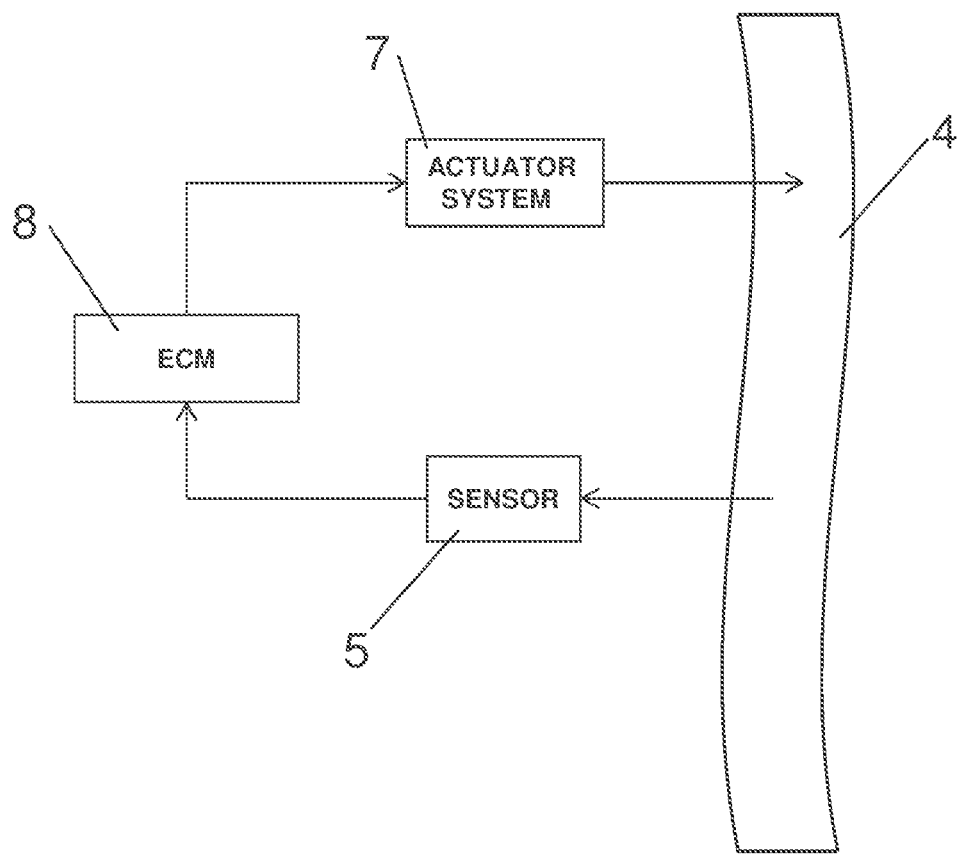
FIG. 3 shows a schematic depiction of apparatus according to an embodiment of the disclosed invention.

Referring to FIG. 3, the apparatus 1 also comprises at least one actuator system 7 which may, for example, comprise a vertical adjustment device for the seatbelt 4. Vertical adjustment of the upper vehicle-side anchoring point of the seatbelt is possible by means of the vertical adjustment device.

Referring again to FIG. 3, the apparatus 1 further comprises an electronic control module (ECM) 8 for controlling the actuator system 7. In this context, the ECM 8 is configured to control the actuator system 7 automatically as a function of a deviation of the safety-relevant actual wear-comfort property, sensed by the sensor element 5, from a predefined, safety-relevant set-point wear-comfort property which corresponds to proper wear of the seatbelt 4 by the occupant. "Proper wear" is defined as a position and fit of the seatbelt relative to the occupant which is, based on all available test results and applicable regulations, expected to provide an optimum combination of safety and comfort for the occupant.

Figure 2:
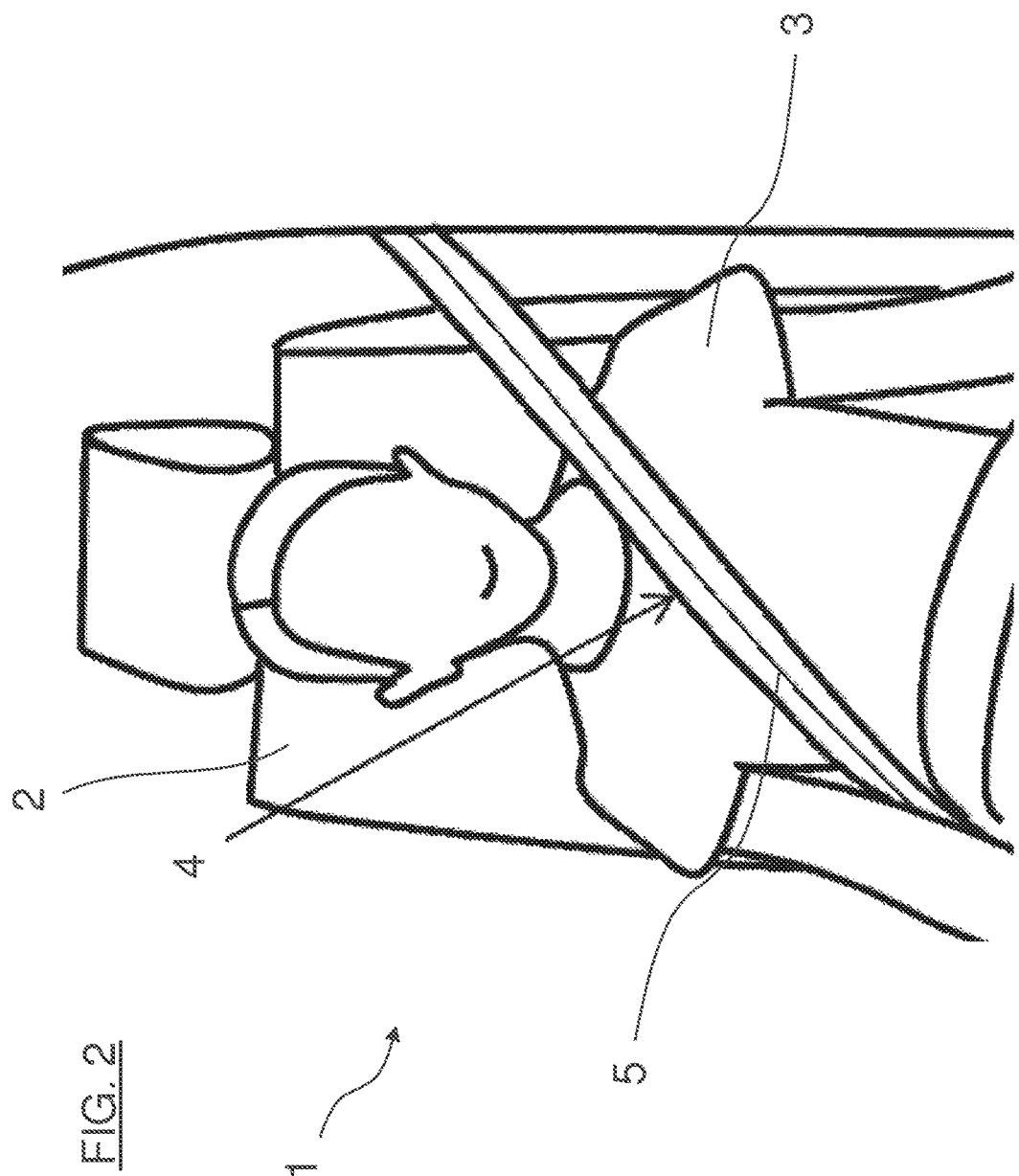
FIG. 2 shows the seatbelt and apparatus from FIG. 1 after the seatbelt contour is adjusted.

FIG. 1 illustrates the seatbelt 4 in a first condition wherein a contour and position of the belt relative to the occupant is not in accordance with proper wear of the belt. Here, the seatbelt 4 runs along the neck of the occupant 3 instead of over the shoulder of the occupant. This seatbelt contour and position can be sensed by means of the sensor 5. In particular, the actual contour of the seatbelt is detected by the sensor 5 to deviates from a predefined set-point contour/position corresponding to the correct or proper wear of the seatbelt in the over-the-shoulder profile. The ECM receives the output of the sensor 5, compares the actual contour/position indicated by the sensor output, compares the actual contour with the predefined set-point contour, finds a deviation between the two, and therefore commands the actuator system automatically to bring about a vertical adjustment of the seatbelt in the necessary fashion. The state after adaptation of the seatbelt height, and therefore the contour corresponding to proper wear of the belt, has taken place is illustrated in FIG. 2.

The apparatus and the method according to the invention have been explained in more detail with reference to an exemplary embodiment illustrated in the figures. The apparatus and the method are, however, not limited to the embodiment described herein but instead also comprise identically acting further embodiments.

In a preferred embodiment, the apparatus according to the invention and the method for improving at least one accident-related, safety-relevant wear-comfort property of a seatbelt which has been put on by a seat occupant in a motor vehicle are used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for a motor vehicle comprising:
 a seatbelt wearable by an occupant of a seat of the motor vehicle, the seatbelt having an upper portion vertically adjustable between a first height and a second height vertically aligned with the first height;
 a sensor for sensing a seatbelt contour while the seatbelt is worn by the occupant at the first height;
 an actuator system operative to move at least the upper portion of the seatbelt between the first height and the second height in a manner to alter the seatbelt contour; and
 a control module operative to compare the seatbelt contour at the first height to a predefined seatbelt contour to determine the seatbelt contour is a neck-engaged contour and, immediately responsive to the determination that the seatbelt contour is a neck-engaged contour, to automatically control the actuator system to move at least the upper portion of the seatbelt from the first height to the second height.

2. The apparatus of claim 1, wherein the sensor is a fiber-optic sensor arranged in the seatbelt.

3. Apparatus comprising:
 a vertically-adjustable seatbelt;
 a sensor sensing a contour of the seatbelt;
 an actuator operative to move a portion of the seatbelt; and
 a control module operative to compare the contour and a predefined contour to determine the contour is a neck-engaged contour; and
 responsive to the determination, controlling the actuator system to vertically adjust the portion of the seatbelt from a first height to a second height vertically aligned with the first height.

4. The apparatus of claim 3, wherein the sensor is a fiber-optic sensor arranged in the seatbelt.

5. A method for adjusting an occupant-worn seatbelt, comprising:
 detecting an actual contour of the seatbelt using a sensor; and
 operating a control module to compare the actual contour and a predefined contour to determine the actual contour is a neck-engaged contour; and
 immediately based on determining the neck-engaged contour, controlling an actuator to move a portion of the seatbelt from a first height to a second height vertically aligned with the first height.

6. The method of claim 5, wherein the sensor is a fiber-optic sensor arranged in the seatbelt.

7. The apparatus of claim 1, wherein the second height is vertically below the first height.

8. The apparatus of claim 3, wherein the second height is vertically below the first height.

9. The method of claim 5, wherein the second height is vertically below the first height.

* * * * *